United States Patent [19]

Conway

[11] Patent Number: 5,150,033
[45] Date of Patent: Sep. 22, 1992

[54] FLAT PLATE SEALED LEAD-ACID BATTERY CHARGING SYSTEM AND METHOD

[75] Inventor: David W. Conway, Cedar Rapids, Iowa

[73] Assignee: Norand Corporation, Cedar Rapids, Iowa

[21] Appl. No.: 282,009

[22] Filed: Dec. 9, 1988

[51] Int. Cl.$^5$ .......................... H02J 7/04; H02H 5/04
[52] U.S. Cl. ........................................ 320/51; 320/35; 429/7
[58] Field of Search .................... 320/2, 51, 35; 429/7

[56] References Cited

U.S. PATENT DOCUMENTS 4,092,580  5/1978  Prinze ................................ 320/51 X
4,255,698  3/1981  Simon ................................ 320/51 X

OTHER PUBLICATIONS

*Electronic Design* (MAG.) "Schottky Diodes Rectify Efficiently in a Bicycle-lighting System" p. 92, Jul. 5, 1977.

*Primary Examiner*—R. J. Hickey
*Attorney, Agent, or Firm*—McAndrews, Held & Malloy, Ltd.

[57] ABSTRACT

A preferred protective current limiter comprises a positive temperature coefficient (PTC) resistor which automatically assumes a relatively high impedance state quickly enough to prevent venting of flat plate lead acid batteries under adverse charging conditions. For example, a fast charger with unlimited current and sixteen volt DC output (such as may be provided by a faulty vehicle electrical system) is found to cause venting without the limiter, while a PTC resistor selected according to the present disclosure safeguards the battery against venting while yet conducting a sufficiently high current to essentially equalize the charge condition of the battery cells within five minutes or less. Preferably a bypass resistor shunts the PTC resistor to avoid any problem which might arise if the PTC resistor became sufficiently heated to assume a current blocking state. At any given charging rate, the shunt resistor shares the total current, tending to moderate the heating of the PTC resistor, and leading to a more efficient charging of the battery after the initial cell equalization phase.

2 Claims, 2 Drawing Sheets

Fig. 1 PRIOR ART
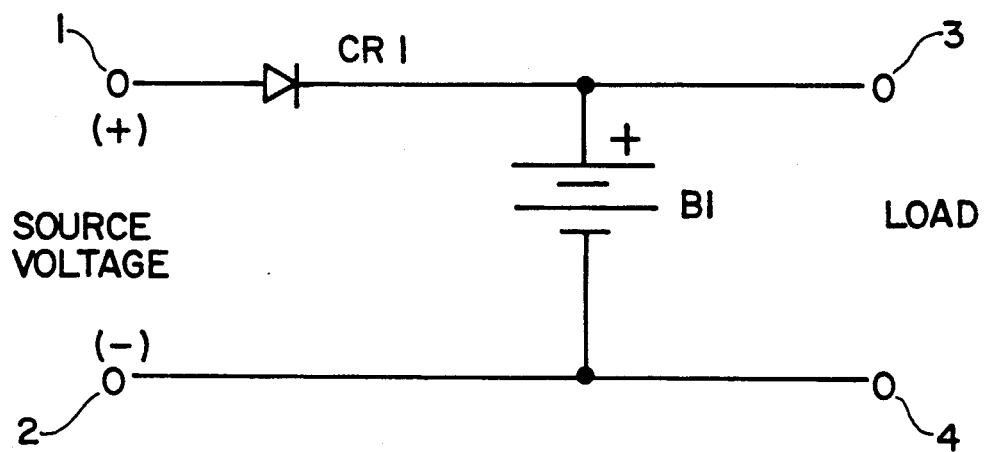
Fig. 2 CHARGE CURRENT VS. TIME
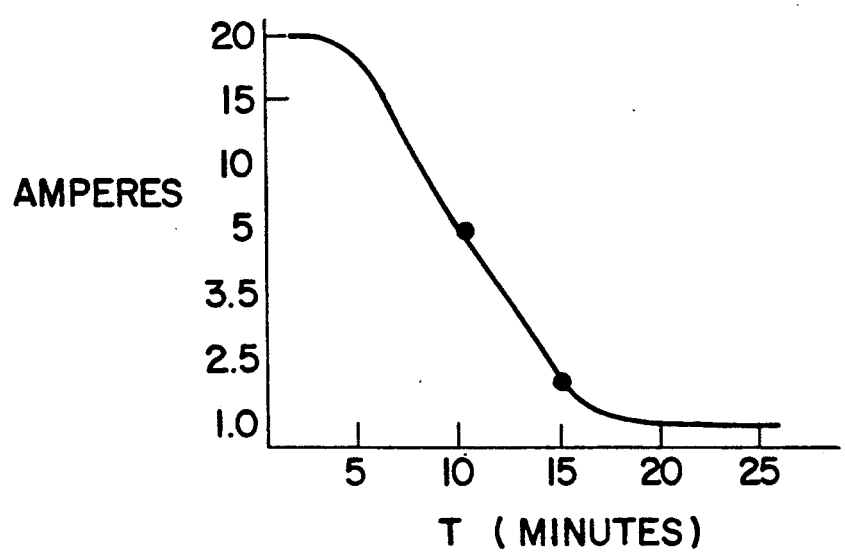

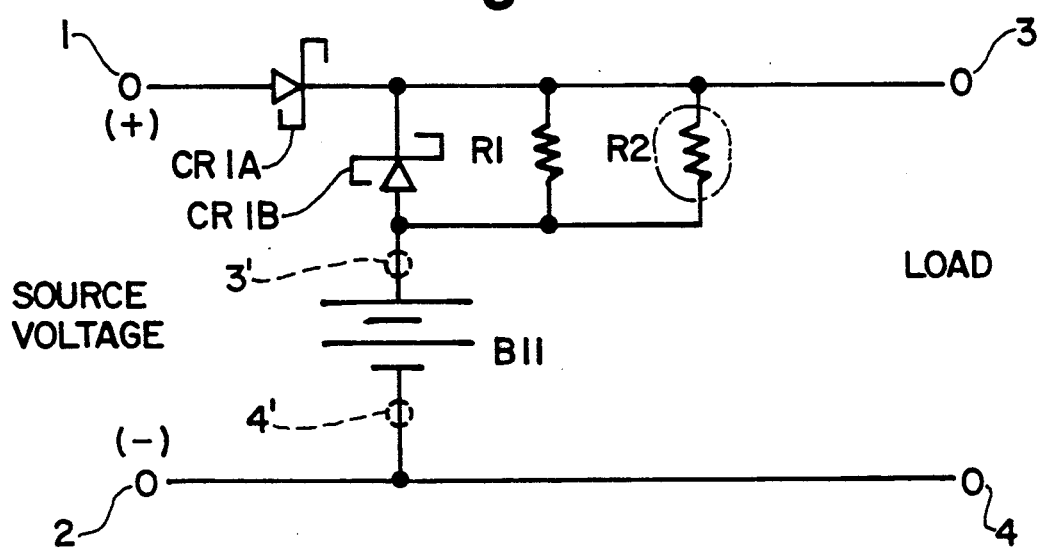
Fig. 3
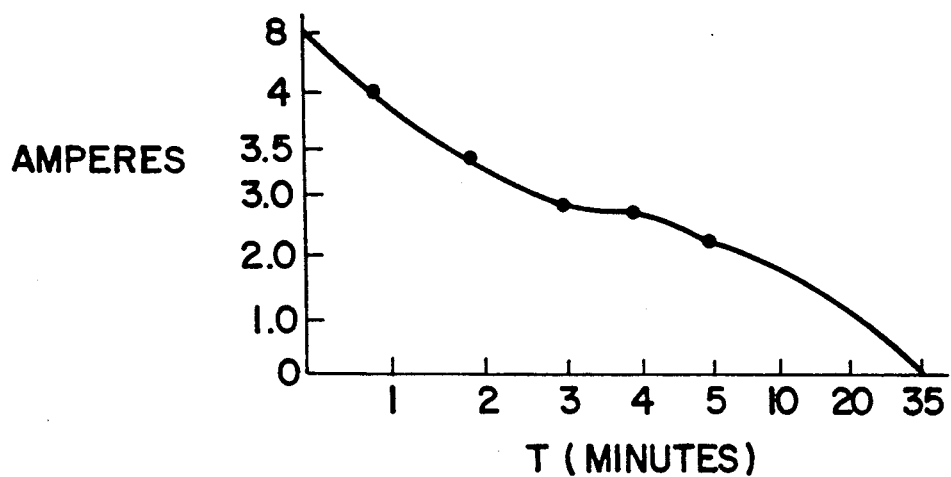
Fig. 4 CHARGE CURRENT VS. TIME

FLAT PLATE SEALED LEAD-ACID BATTERY CHARGING SYSTEM AND METHOD

BACKGROUND OF THE INVENTION

Commercial sealed lead-acid batteries as manufactured during the 1970's were a reliable source of power, provided long life and were extremely rugged in terms of their construction.

This construction allowed high amperage charge rates. By way of practical example, completely discharged "D" cell batteries when connected to a constant current source may take up to 15 amperes of current producing an internal pressure of 15 psi. Safety vents common to spiral wound battery constructions "vent" at 50psi during extreme abusive situations to prevent the possibility of container rupture. These worthy attributes were recognized and utilized by the commercial industry.

A flat plate sealed lead-acid battery construction was later developed and was dictated by the desire for automated production and consequent significant unit cost reduction. The flat plate design is handled easily by machinery which literally stamps the plates and separators out by the millions and then stacks them. The stacks of plates and separators are sealed into single ply plastic housings after injection with electrolyte. These manufacturing techniques produced sealed lead-acid batteries which are nearly ⅓ the size and weight of a spiral wound battery with equal ampere hour capacity and yield a cost reduction in excess of 50% per unit. Due to these desirable features of low cost, reduced weight and high capacity, the flat plate design is currently dominating the 1980's market place. The major feature which was lost in the flat plate design was the ability to accept unlimited amounts of charge current, this feature only being exhibited by the spiral wound cell construction.

Flat plate cells when charged with an abundant source current will vent, releasing raw materials required for the electro-chemical reaction and thereby decreasing the battery capacity. This fact is immediately recognized by comparison of the pressure required for operation of the safety vent systems in flat plate and spiral wound constructions. Spiral wound cells due to their expensive rugged construction require greater than 50 psi to vent, allowing high charge currents, compared to 1–6 psi necessary for operation of the flat plate vents. To ensure a long life of reliable operation from the flat plate batteries their charge current must be limited to a lower value than spiral wound cells, e.g. 0.4C (0.4×ampere hour rating).

To capitalize on the availability of flat plate batteries as a source of cheap Power, it would be advantageous to develop extremely economical and effective circuitry for limitation of charge current.

SUMMARY OF THE INVENTION

It is therefore an object of the present invention to provide a safe and reliable charging system and method for flat plate batteries which is of unique economy and simplicity.

In an optimum embodiment only three components are used, a positive temperature coefficient (PTC) resistor which essentially provides an initial fast charge and then opens due to its abrupt increase in resistance, a fixed resistor for limiting the continuous charge current, and a dual schottky diode which prevents self discharge of the battery back through the source and provides a current path for load demands on the battery, which bypasses the PTC resistor. This configuration prevents the detrimental effects which result when flat plate sealed lead-acid batteries are charged with unlimited current and semi-regulated voltages, for example as typically associated with automotive electrical systems In a preferred solution, the charging system uses a combination of current controlling resistors. The first resistor is preferably a PTC type to allow a high peak charge current for equalization of individual cells and which then changes to a high impedance state terminating the fast charge rate. The second resistance means may be in the form of a fixed power wirewound resistor which allows the system to sustain the charging process while limiting the relatively longer term charge current to a value specified by the battery manufacturer. Further desirable features in addition to current limiting are gained through incorporation of a dual schottky diode component which provides the ability to prevent the battery from discharging back through the source supply and also provides a path for load current bypassing the PTC resistor.

Exemplary features of the invention include the following:

(1) A protective current limiter for flat plate lead-acid batteries which allows a high peak current for equalization of individual battery cells then self terminates the high charge rate allowing other circuit means to maintain a sustainable charge rate e.g. of four-tenths rated capacity (0.4C).

(2) A protective current limiter according to feature (1) which utilizes a positive temperature coefficient resistor to provide a charge rate of about three times rated capacity (3C). The PTC resistor changes to a high impedance state after initial cell equalization.

(3) In a further development, when the protective current limiter of feature (1) or (2) has terminated the high charge rate, a second current limiter becomes effective to limit charging current to a sustainable charge rate e.g. of four-tenths rated capacity (0.4C).

(4) In conjunction with any of the foregoing features a schottky diode which allows instantaneous current flow to the load regardless of the PTC resistor state.

(5) A protective current limiter according to any of the foregoing features which can be connected to a virtually unlimited current source such as an automotive or vehicle electrical system.

The invention will now be described, by way of example and not by way of limitation, with references to the accompanying sheet of drawings; and other objects, features and advantages of the invention will be apparent from this detailed disclosure and from the appended claims.

BRIEF DESCRIPTION OF THE DRAWINGS

FIG. 1 is a schematic diagram illustrating a prior art system for charging spiral wound sealed lead-acid cells.

FIG. 2 shows a plot of charge current as a function of time useful in explaining the present invention.

FIG. 3 is a circuit diagram for illustrating a preferred embodiment in accordance with the present invention.

FIG. 4 shows a plot of charge current as a function of time for the case where a fast charge is applied to a battery via a protective circuit as shown in FIG. 3.

DETAILED DESCRIPTION

FIG. 1 shows a prior art arrangement for charging sealed lead-acid batteries from a vehicle alternator Terminal 1 is connected to the positive alternator terminal and terminal 2 provides a return. The charge current is limited only by the negligible resistance of the wire which interconnects the components. Due to the virtually unlimited charge current supplied by the alternator, this scheme is only applicable to sealed lead-acid spiral wound cells such as represented by battery B1, FIG. 1.

FIG. 2 shows the charge current vs time for a battery B1 with spiral wound cells and a charging system as represented in FIG. 1. This graph clearly gives an indication that the 0.4C charge rate required by flat plate sealed lead-acid cells would be drastically exceeded producing an over-charge rate of ten times rated capacity (10C), with rated capacity equal to two ampere hours.

In FIG. 1, diode CR1 prevents self-discharge of battery B1 back through the source, while terminal 3 provides a positive supply voltage from either the source or battery and terminal 4 provides the return.

As explained in the section headed "SUMMARY OF THE INVENTION" it is desired to provide a charging system and method for the flat plate cell construction which is capable of being connected to a DC (direct current) source such as an automotive electrical system for fast initial battery charging but which is of minimal cost, component count and weight while limiting the longer term charging current to an acceptable safe value suitable for prevention of electrolyte loss through gassing from the battery vents (which ultimately leads to the reduction of available energy capacity from the battery). Additionally the system should eliminate the possibility of battery explosion due to a malfunction of the source voltage regulation device or protective cell vents.

All flat plate sealed lead acid batteries, regardless of manufacturer, will vent during charging from a source of virtually unlimited current. There is the further hazard in automotive systems of severe venting should the alternator regulator become defective raising the charging voltage up to 16 volts. Elevated temperatures (50° C.) further aggravate all venting conditions.

FIG. 3 depicts a schematic diagram of a preferred battery charge current limiter according to the present invention with provisions for preventing cell venting of flat plate sealed lead-acid batteries even when charged at 50° C. and at a potential of 16 volts direct current (defective voltage regulator). A preferred current limiter may enable the battery to supply full power to a load, regardless of the impedance state of the current limiter.

Input voltage terminal labeled 1 may be connected to the positive input source of virtually unlimited current such as provided by an automotive electrical system; while terminal 2 provides a return path or ground. With a positive voltage applied to terminal 1 CR1A becomes forward biased providing energy to the load. Should battery B11 with flat plate cells require charging, current flows, through both resistance means R1 and R2. Resistance means R2 is preferably a positive temperature coefficient resistor, such as manufactured by Raychem Corporation, which allows a fast charge rate e.g. of 3C. For a 12 volt Panasonic battery type LCS-2012-VBNC rated at 2 ampere hours, C=2, and 3C=3×2 ampere hours=6 amperes.) The fast charge rate is limited to a time duration of about five minutes which is sufficient to effect equalization of individual battery cells. Due to the nature of the positive temperature coefficient of a preferred resistance means R2, its resistance increases from 0.030Ω to a high impedance state terminating overcharge. At this time R1 sustains the charging process. R1 should be selected based on actual battery manufacture specifications e.g. 0.4C or: 0.4×2 ampere hour =800 milliamperes. Since the maximum voltage of any automotive system would be 16 volts, the, following value may be calculated for fixed resistance means R1, where the terminal voltage of battery B11 is desired to be 14.2 volts, requiring a voltage drop at R1 of 16 volts minus 14.2 volts, or 1.8 volts:

$$R1 = \frac{1.8 \text{ volts}}{800 \text{ milliamps}} = 2.25\Omega (2.25 \text{ ohms})$$

(2.5Ω may be used as a standard value)

Regardless of the source voltage or resistance value of R1, CR1B always provides a path for current to the load. If CR1B were not present R1 may have been triggered to its high impedance state during a charging operation, and the load current from battery B11 would be limited by R1.

This combination of protective current limiting and dual function schottky rectifier results in the prevention of detrimental cell venting under worst case conditions such as virtually unlimited charge current, abnormal source voltages and temperature extremes, while allowing usage of flat plate lead-acid batteries over spiral wound constructions for significant cost reduction.

In the exemplary embodiment resistor R2 may have a nonlinear resistance characteristic as a function of time such that a current of the order of three times battery capacity may flow for a limited safe time duration not substantially exceeding five minutes after which the resistance of the resistor R2 relatively abruptly increases to a high impedance value which is at least ten times the initial resistance value of R2 in the absence of current flow therethrough. The resistor R2 also has a nonlinear resistance characteristic as a function of current flow therethrough since the resistance value of R2 may remain at the high impedance value even though the current flow therethrough is correspondingly reduced to a relatively low value for the remainder of a charging cycle, e.g. for a period of twenty minutes or indefinitely (e.g. six hours or more).

The resistor R2 may be described as self terminating for the high charge rate of more than twice rated battery capacity (e.g. 3C) since it automatically changes from a low resistance value (e.g. 0.030 ohm) to a high impedance state (e.g. orders of magnitude higher resistance) when its temperature exceeds a specific temperature value. Further not only does the resistor R2 undergo a large, abrupt change in resistance in response to a high current value and/or high ambient temperature, but the resistor automatically retains the high impedance state for currents of the order of four-tenths rated battery capacity, while automatically resetting to its initial state when allowed to return to a normal temperature range, e.g. during normal portable operation.

Characteristics of suitable commercially available positive temperature coefficient resistors are given in APPENDIX A hereto.

The battery pack consisting essentially of components B11, R1, R2, CR1A and CR1B may form a unitary portable power source with terminals such as indicated at 1, 2, 3, 4. Such a battery pack with integral protective current limiter can be of configuration so as to be quickly insertable into and quickly removable from a portable product such as the Model 815 eighty column portable printer of Norand Corporation. In this environment battery B11 might be a twelve volt lead-acid flat plate battery with a rated capacity of 1.8 ampere hours. Such a portable system can be used for a number of hours and then coupled to a charger for recharging Such operation is known as cyclic service, and is distinguished from a case known as no-break standby float service where the battery is permanently on charge, and is fully or partly discharged only a few times during its entire period of use (e.g. in the event of a mains power failure). In the embodiment of FIG. 3, the resistance means R2 preferably resets to its low resistance state even with a maximum load on battery B11, e.g. one ampere.

By way of example, where the battery pack of FIG. 3 is used with the portable printer unit known as the Model 815 Printer of Norand Corporation, a cable may be used to connect terminals 1, 2 with an automotive electrical system when the portable unit is being transported by an automotive vehicle after use outside of the vehicle. For example, such a cable can be plugged into a cigarette lighter socket of the vehicle. Alternatively, a special twelve volt outlet may be installed in the vehicle, in which case the components CR1A and CR1B, R1 R2 can be installed in the vehicle, the load being connected at 3'; 4', FIG. 3, and terminal 3 being omitted. The terminals 3'; 4', may then represent a plug and socket connection between the vehicle twelve volt outlet and the battery B11 of the portable device.

FIG. 4 shows charge current in amperes as a function of time in minutes for the case where a fast charge is applied to a flat plate lead acid battery such as the Panasonic 12 volt, 2.0 ampere-hour type LCS-2012 AVBNC, the Panasonic 12 volt, 1.8 ampere-hour type LCR-1812 VBNC, or the Sonnenschein 12 volt, 2.7 ampere-hour type A200 (part No. 07190205). Fast charging is effected with a high current supply for supplying 16.0 volts and unlimited current. Each battery is discharged and then connected as shown at B11 in FIG. 3. R1 comprised two five ohm resistors in parallel (2.5 ohms) and R2 was a type RDE305A positive temperature coefficient resistor. The ambient temperature was 25° C.

While two of the foregoing batteries were found to vent when subjected to fast charge at 50° C. via the prior art circuit of FIG. 1, there is no venting at 50° C. using the current limiting means of FIG. 3. It is concluded that implementation of the current limiting means of FIG. 3 successfully prevents electrolyte loss at detrimental charge voltages (16 volts DC; faulty vehicle electrical system) and temperatures (e.g. 50° C.).

FIG. 3 may be taken as showing a unitary flat plate lead acid battery pack with external terminals 1,2,3,4 and with an integrated protective circuit, CR1A, CR1B, R1, R2, as a permanent part of the battery pack, and located within an external case of the battery pack.

FIG. 3 would show a two terminal battery pack having an integrated protective circuit CR1B, R1 and R2, with the elimination of CR1A and terminals 1 and 2. Again the protective circuit could be within an external case of the battery pack and form a permanent part thereof, safeguarding the battery against venting under normally detrimental charging conditions such as described herein.

For the case where the protective circuit CR1A, CR1B, R1, R2 is integrated with a vehicle and fixedly connected to the vehicle charging system, a portable printer with a flat plate lead acid battery therein could be releasably coupled with the vehicle at 3', 4' in FIG. 3. Automatic coupling connections are currently used for charging the batteries of hand-held terminals when the terminals are bodily inserted into charging system receptacles, and similar automatic coupling could take place as a portable printer is bodily inserted into a receptacle therefor of the vehicle. In such a vehicle charging system for a portable printer, the input source voltage at 1,2 would be connected to the printer via current limiting components R1, R2 also, since the printer electrical system as well as the printer battery would be connected at 3', 4', FIG. 3.

An exemplary eighty-column modular printer system is described in Appendix B hereto.

Description of FIG. 4

Referring to FIG. 4, it will be observed that in the first minute the average charging current is about six amperes (about 3C, where C is two ampere-hours), and that in the first five minutes, the charging current averages about 3.5 amperes (or more than 1.5C). A progressively reducing charging current e.g. from about eight amperes (4C) to about two amperes (1C) over a time interval of about five minutes is found not to cause cell venting, but is considered sufficient to substantially equalize individual battery cells.

In the circuit of FIG. 3, without the PTC resistor R2, initial current flow for a discharged battery with a voltage of 10.8 volts would be about two amperes. As shown in FIG. 4, with the presence of PTC resistor R2 in FIG. 3, the initial current flow rapidly assumes a value less than the twenty amperes (10C) of FIG. 2, but substantially greater than two amperes (1C), e.g. about eight amperes (4C). The bypass resistor R1 reduces the heating of PTC resistor R2 and thus assists in maintaining a charging current substantially greater than would be the case if PTC resistor R2 were in a completely current blocking state during a time interval from T equals five minutes to T equals twenty minutes in FIG. 4.

As an indication of the relative current flow in a fixed resistor R1 of 2.5 ohms and a PTC resistor R2 to give a resultant charging current as in FIG. 4, the following Tables A and B show the results of rough calculations assuming an applied unlimited charging potential of sixteen volts, an initial voltage at battery B11 of 10.8 volts; a battery voltage of 10.9 volts at T=10 seconds, FIG. 4; a battery voltage of 11.0 volts at T=1 minute; a battery voltage of 12.0 volts at T=5 minutes; a battery voltage of 13.7 volts at T=10 minutes; and a battery voltage of 13.9 volts at T=20 minutes.

TABLE A

| Calculated Values of R2 as a Function of Time Based on Charging Current as a Function of Time as in FIG. 4 | | |
|---|---|---|
| Time (Minutes) | Resistance of R1 (ohms) | Approximate Resistance of R2 (ohms) |
| 0 | 2.5 | .06 |
| 1/6 | 2.5 | .9 |
| 1 | 2.5 | 2.5 |
| 5 | 2.5 | 10 |
| 10 | 2.5 | 2 |

TABLE A-continued

Calculated Values of R2 as a Function of Time Based on Charging Current as a Function of Time as in FIG. 4

| Time (Minutes) | Resistance of R1 (ohms) | Approximate Resistance of R2 (ohms) |
|---|---|---|
| 20 | 2.5 | 4 |

TABLE B

Values of Current Flow in R1 and R2 Generally Corresponding to the Resistance Values of Table A

| Time (Minutes) | Current Flow in R1 (amperes) | Current Flow in R2 (amperes) | Total (amperes) |
|---|---|---|---|
| 0 | 2 | 18 | 20 |
| 1/6 | 2 | 6 | 8 |
| 1 | 2 | 2 | 4 |
| 5 | 1.6 | .4 | 2 |
| 10 | .9 | 1.1 | 2 |
| 20 | .8 | .5 | 1.3 |

It will be apparent that many modifications and variations may be effected without departing from the scope of the teachings and concepts of the present disclosure.

I claim as my invention:

1. In a battery charging system,
   flat plate lead-acid battery means for association with a portable unit and for cyclic recharging after periods of portable use, said battery means having plural cells providing a given rated capacity, and
   protective current limiting circuit means comprising resistance means interposed so as to control charging current to said battery means,
   said resistance means automatically responding to current flow therein due to a maximum applied charging voltage and the battery means being in a substantially discharged state, to limit charging current to a schedule of values as a function of time which reliably avoids venting of the battery means while effecting substantial recharging of the battery means in not more than about one-half hour, said flat plate lead-acid battery means together with said resistance means forming a battery pack which is removable from and replaceable in a portable unit as a single entity, said battery pack consisting essentially of said flat plate lead-acid battery means, said resistance means, and schottky diode means providing bypass diode means defining a bypass current path bypassing said resistance means for accommodating load current flowing from said battery means.

2. In a battery charging system according to claim 1, said schottky diode means further providing diode means in series with a parallel arrangement of the resistance means and said bypass diode means.

* * * * *